(12) United States Patent
Palermo et al.

(10) Patent No.: US 6,514,323 B1
(45) Date of Patent: Feb. 4, 2003

(54) PURIFICATION ASSEMBLIES AND PURIFICATION METHODS

(75) Inventors: Brian Palermo, Richford, NY (US); Eric Edlund, Homer, NY (US)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/720,203

(22) PCT Filed: Jun. 24, 1999

(86) PCT No.: PCT/US99/14377
§ 371 (c)(1), (2), (4) Date: Jul. 23, 2001

(87) PCT Pub. No.: WO99/67007
PCT Pub. Date: Dec. 29, 1999

Related U.S. Application Data

(60) Provisional application No. 60/090,449, filed on Jun. 24, 1998, and provisional application No. 60/093,273, filed on Jul. 17, 1998.

(51) Int. Cl.[7] .............................................. B01D 35/30
(52) U.S. Cl. ............................ 95/273; 55/502; 55/503; 55/505
(58) Field of Search ............................... 95/273; 55/502, 55/503, 505, 490, 495, 510, 385.1

(56) References Cited

U.S. PATENT DOCUMENTS

| | | | | |
|---|---|---|---|---|
| 4,259,099 A | * | 3/1981 | Akabane et al. | 210/316 |
| 4,382,808 A | * | 5/1983 | Van Wormer et al. | 210/440 |
| 5,234,165 A | * | 8/1993 | Rhyne, Jr. | 210/333.1 |
| 6,015,444 A | * | 1/2000 | Craft et al. | 220/371 |
| 6,447,565 B1 | * | 9/2002 | Raszkowski et al. | 220/371 |

* cited by examiner

*Primary Examiner*—Robert A. Hopkins
(74) *Attorney, Agent, or Firm*—Leydig, Voit & Mayer, Ltd.

(57) ABSTRACT

A purification assembly (10) includes a block (20) and a purification element (40) disposed in the block (20). The block (20) includes first (50) and second (60) pieces attachable to each other and has first (22) and second (24) flow paths. The block (20) also includes a cavity (30) defined by the first (50) and second (60) pieces and disposed in the first (22) flow path. The purification element (40) is disposed in the cavity (30) and in the first fluid flow path (22), wherein fluid flowing through the first fluid flow path (22) passes through the purification element (40). A method for purifying gas includes directing gas through a purification assembly installed between a fluid device (10) and a manifold (2).

46 Claims, 6 Drawing Sheets

PURIFICATION ASSEMBLIES AND PURIFICATION METHODS

This application claims the priority of U.S. provisional patent application 60/090,449, filed Jun. 24, 1998, and U.S. provisional patent application 60/093,273, filed Jul. 17, 1998, which applications are incorporated by reference in their entirety.

FIELD OF THE INVENTION

This invention relates to purification assemblies and purification methods. More particularly, it relates to purification assemblies used to purify gases and methods for purifying gases, such as gases used in the manufacture of semiconductors.

BACKGROUND OF THE INVENTION

Gases used in industrial processes are often purified to remove particulate matter, such as solids, colloids, gels, and liquids, and chemical substances, such as chemical contaminants. In the manufacture of semiconductors, for example, it is important that the gases are purified to remove particulate matter because particulate matter in the gases can introduce flaws into the semiconductors being manufactured. Therefore, it is common to install one or more purification assemblies in the tubing lines for carrying these gases.

There are a number of conventional methods of mounting a purification assembly in a tubing line. Typically, a conventional purification assembly and one or more other fluid devices are linearly mounted on a surface of a long, narrow manifold installed in the tubing line. These other fluid devices may include a manual valve, a regulator, a transducer, a pressure valve, a flow meter, etc. Each fluid device may include an inlet port and an outlet port. The manifold may include a number of fluid conduits, each of which may be generally V-shaped to provide fluid communication between the inlet port of one fluid device and the outlet port of another fluid device, allowing the fluid to flow from one fluid device to the other fluid device.

In operation, the gas enters the manifold through an inlet at one end of the manifold and then enters a first fluid device through its inlet port. The gas subsequently exits the first fluid device through its outlet port and enters a second fluid device through its inlet port via a V-shaped manifold conduit connecting the two fluid devices. The gas then exits the second fluid device and enters a third fluid device via a V-shaped manifold conduit, and so on for each of the many fluid devices mounted on the manifold. Finally, the gas exits the final fluid device and then exits the manifold through an outlet at the other end of the manifold.

One of the problems associated with the conventional methods of installing fluid devices in the tubing line is that the fluid devices occupy a large segment of the tubing line and/or a large space envelope because the fluid devices are arranged linearly along a manifold installed in the tubing line. Thus, it may be difficult to accommodate a long manifold in the tubing line where the space requirement is stringent, such as in the manufacture of semiconductors.

SUMMARY OF THE INVENTION

The present invention alleviates the problem associated with the conventional methods of installing fluid devices in a tubing line by providing a purification assembly that does not require an additional site on the manifold or increased volume in the tubing line. The purification assembly includes a purification element disposed in a block placed between a fluid device and a manifold, and, therefore, the purification assembly and the fluid device occupy the same segment of the tubing line. In this arrangement, the purification assembly is not linearly arranged with the rest of fluid devices, making it easier to accommodate a purification assembly.

In accordance with one aspect of the invention, a purification assembly includes a block, a cavity and a purification element. The block includes first and second pieces attachable to each other and first and second fluid flow paths. The cavity is defined by the first and second pieces and is disposed in the first flow path. The purification element is disposed in the cavity and in the first fluid flow path, and the fluid flowing through the first fluid flow path passes through the purification element.

In accordance with another aspect of the invention, a purification assembly includes a block and a purification element. The block has first and second opposite mounting surfaces and includes a plurality of bores extending between the first and second mounting surfaces. The purification element is disposed in one of the bores.

In accordance with still another aspect of the invention, a purification assembly for use with at least one fluid device includes a block and a purification element disposed in the block. The block has a mounting surface arranged to receive the fluid device. The purification element is arranged to purify gases flowing to or from the fluid device.

In accordance with a further aspect of the invention, an assembly for processing gases includes a purification assembly, a fluid device, and a manifold. The purification assembly is disposed between the fluid device and the manifold.

In accordance with a still further aspect of the invention, a method for purifying gas used in the manufacture of semiconductors includes directing gas through a purification element disposed in a block placed between a fluid device and a manifold.

DESCRIPTION OF PREFERRED EMBODIMENTS

Figure 1:
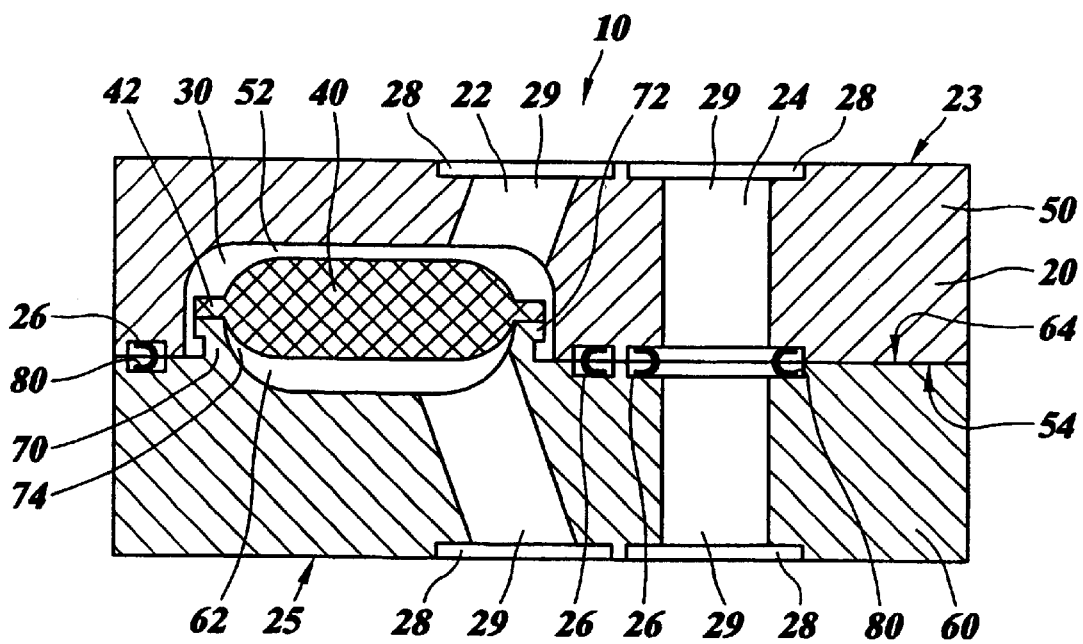
FIG. 1 is a cross-sectional view of an embodiment of a purification assembly according to the present invention.

Purification assemblies embodying the invention may be configured in a variety of ways. FIG. 1 is a cross-sectional view of one embodiment of a purification assembly according to the present invention. The purification assembly 10 includes a block 20 and a purification element 40 disposed in the block 20. The block 20 may include at least first and second pieces 50, 60 and inlet and outlet flow paths 22, 24.

The block 20 may also include a cavity 30 in fluid communication with the inlet flow path 22, and the purification element 40 may be disposed in the cavity 30 and in the inlet flow path 22. Alternatively, the cavity 30 may be in fluid communication with the outlet flow path 24, and the purification element 40 may be disposed in the cavity 30 and in the outlet flow path 24.

The block may have any suitable configuration, including an irregular configuration or a regular configuration, such as a cylindrical, disk-shaped or boxy configuration. The block may comprise a single unitary or integral block, or it may comprise a plurality of pieces attachable to one another to form the block. In the embodiment shown FIG. 1, for example, the block 20 has a generally boxy configuration and includes first and second pieces 50, 60 attachable to each other. The pieces may be permanently fixed to one another, e.g. by welding, ore removably attached, e.g., by bolting. The dimensions of the block may vary widely from one embodiment to another. In FIG. 1, the base of the block 20 may be about 38 mm by 38 mm and the height may be about 17 mm. Although the two pieces 50, 60 shown in FIG. 1 have similar configurations, they may have very different configurations, for example, different shapes and/or different dimensions, such as different thickness. For example, one of the pieces may comprise substantially the entire block with a hole, and the other piece may be a plug insertable into the hole. The cavity may be formed by the bottom portion of the hole and the bottom surface of the plug.

The block may include one or more mounting surfaces. When the block is installed between a fluid device and a manifold, one of the mounting surfaces may face and contact the fluid device and another mounting surface may face and contact the manifold. In the embodiment illustrated in FIG. 1, the block 20 includes two substantially flat mounting surfaces 23, 25 disposed on different pieces 50, 60, although the mounting surfaces may be on the same piece.

If the block includes a plurality of pieces, the pieces may each include one or more facing surfaces. When the pieces are attached to one another to form a block, a facing surface of one piece may be mounted to a facing surface of at least one other piece. In the exemplary embodiment shown in FIG. 1, each of the two pieces 50, 60 has a single facing surface 54, 64. When the two pieces 50, 60 are attached to each other to form the block 20, the two facing surfaces 54, 64 are mounted to each other.

The inlet flow path of the purification assembly provides fluid communication between the inlet port of the fluid device and a fluid conduit of the manifold, and the outlet flow path of the purification assembly provides fluid communication between the outlet port of the fluid device and another fluid conduit of the manifold. To this end, each of the inlet and outlet flow paths extends between the mounting surface facing the fluid device and the mounting surface facing the manifold. Generally, the inlet and outlet flow paths may be variously configured. In the exemplary embodiment 10 shown FIG. 1, the inlet flow path 22 has an irregular configuration while the outlet flow path 24 has a straight-line configuration. Alternatively, the inlet or outlet flow path 22, 24 may have, for example, any other suitable configuration, such as an L-shaped or V-shaped configuration. In some embodiments, the inlet and outlet flow paths may be placed at any suitable location while in other embodiments, the positions of the flow path openings on the mounting surfaces are preferably standardized to accommodate openings on the manifold and those on the fluid device.

The cavity 30 is provided to contain the purification element and may have a configuration similar to that of the purification element. In the embodiment shown in FIG. 1, for example, the cavity 30, similar to the purification element 40, has a generally disk-shaped configuration. Alternatively, the cavity may have any suitable configuration, including an irregular configuration or a regular configuration, such as a cylindrical, elliptical, disk-shaped or boxy configuration.

Preferably, the cavity is in fluid communication with one of the inlet and outlet flow paths, and it may be disposed at any suitable location along the flow path. In the embodiment shown in FIG. 1, the cavity 30 is disposed in the inlet flow path 22 spaced from the flat mounting surfaces 23, 25, for example, at the interface between the first and second pieces 50, 60. The cavity 30 may include two portions 52, 62 which are respectively disposed in the two pieces 50, 60. When the two pieces 50, 60 are attached to each other, the two cavity portions 52, 62 form the cavity 30. This feature is advantageous because it allows easy access to the interior of the cavity 30 and the purification element 40 disposed in the cavity 30 when the two pieces 50, 60 are detached from each other. Alternatively, the cavity 30 may be disposed only in the first piece 50 or only in the second piece 60.

The purification assembly may include one or more seals to prevent leakage. Between the facing surfaces, for instance, a seal, such as a C seal or an O-ring seal, may be disposed around the inlet flow path and another seal may be similarly disposed around the outlet flow path, to seal the inlet flow path and the outlet flow path from each other and/or from the exterior of the purification assembly. In the embodiment shown in FIG. 1, for example, C seals 80 are provided for this purpose. A C seal 80 may be placed within a groove or recess 26 disposed around each of the flow paths 22, 24. On the mounting surfaces 23, 25, each of the flow path openings 29 may include a groove or recess 28 to accommodate a seal. When the block 20 is mounted to the fluid device and/or the manifold, the seals prevent leakage between the block and the fluid device and between the block and the manifold.

The purification element 40 shown in FIG. 1 has a generally disk-shaped configuration with a circular flange 42 disposed around its outer periphery, although the purification element may have any suitable configuration. The purification element may be cylindrical, conical or dome-shaped, for example. The surface of the purification element 40 is substantially flat on a macroscopic scale, but it is possible for it to be formed with ridges or corrugations to increase the surface area.

Preferably, the purification element is sealingly disposed in the inlet flow path (or the outlet flow path) so that a substantial amount, or more preferably all, of the gas passing through the inlet flow path (or the outlet flow path) passes through the purification element. In the embodiment shown in FIG. 1, the block 20 includes a mounting arrangement such as an annular standoff 70, on which the purification element 40 is mounted. The annular standoff has an opening 74, through which the fluid flowing through the inlet flow path 22 (or the outlet flow path 24) preferably passes. The purification element 40 may be sealingly disposed across the opening 74 of the standoff 70 such that the fluid passing through the inlet flow path 22 (or the outlet flow path 24) passes through the purification element 40. The standoff may have any suitable configuration that allows it to be sealingly attached to the purification element 40, for example, to the flange 42 of the purification element 40. In the embodiment shown in FIG. 1, the standoff includes a flange 72 to which the flange 42 of the purification element 40 is sealingly attached. An advantage of this arrangement is that both the flange 72 of the standoff 70 and the flange 42 of the purification element 40 have a relatively small mass so that only a small heat load is required to weld the purification element 40 to the standoff 70. Alternatively, the purification element may be mounted in the cavity in any suitable way. For example, the purification element may be directly mounted to the inner surface of the cavity.

The standoff may be disposed within the cavity in any suitable way. In the present embodiment, for example, the standoff 70 is attached to or forms an integral or unitary part with the inner surface of the cavity 30. More specifically, the standoff 70 forms a unitary part with the second piece 60, and the standoff 70 extends away from the second piece 60 into the cavity 30. Alternatively, the standoff 70 may form a unitary part with the first piece 50, and/or it may extend into the cavity 30 from the first piece 50.

Figure 2:
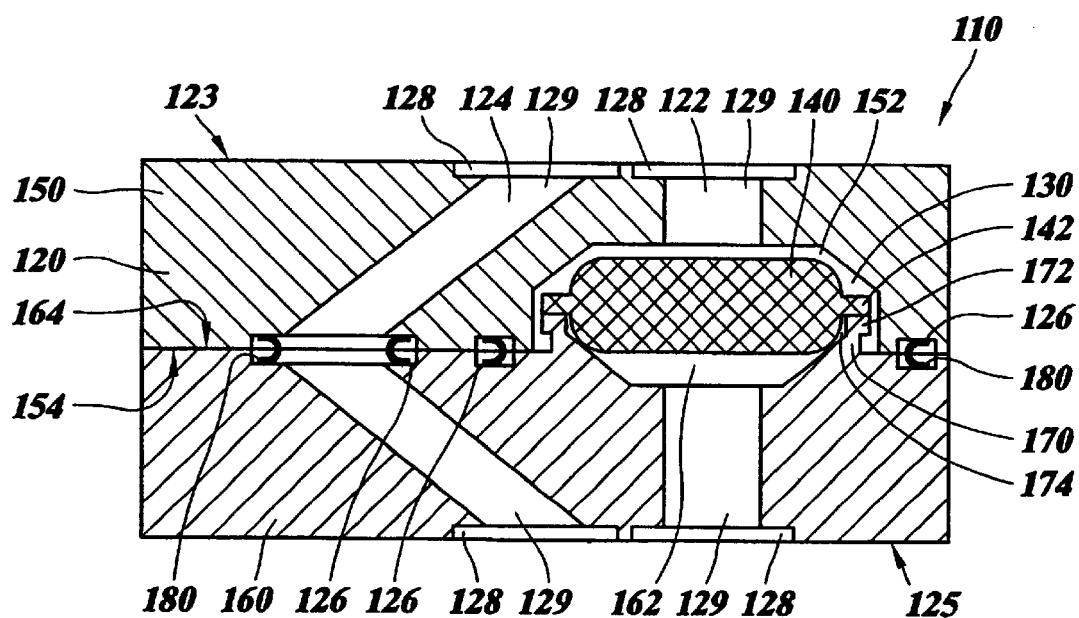
FIG. 2 is a cross-sectional view of another embodiment of a purification assembly according to the present invention.

FIG. 2 illustrates another embodiment of the purification assembly according to the present invention and features similar to those of the first embodiment have reference numerals which differ by 100 from those of the first embodiment. The purification assembly 110 of the embodiment shown in FIG. 2 comprises a block 120 and a purification element 140 disposed in the block 120. The block 120 may include an inlet flow path 122, an outlet flow path 124 and a cavity 130 in fluid communication with the outlet flow path 124. The purification element 140 is disposed within the cavity 130 and sealingly disposed in the outlet flow path 122. In the present embodiment of the purification assembly 110, the cavity 130 and the purification element 140 are disposed in the outlet flow path 124, which has a straight-line configuration as opposed to an irregular configuration as shown in FIG. 1. Additionally, the cross section of the cavity 130 has a generally polygonal configuration, while the cross section of cavity 30 shown in FIG. 1 has a generally elliptical configuration. Furthermore, the inlet flow path 122 bends at a more acute angle than the inlet flow path 22 does as shown in FIG. 1.

Figure 3:
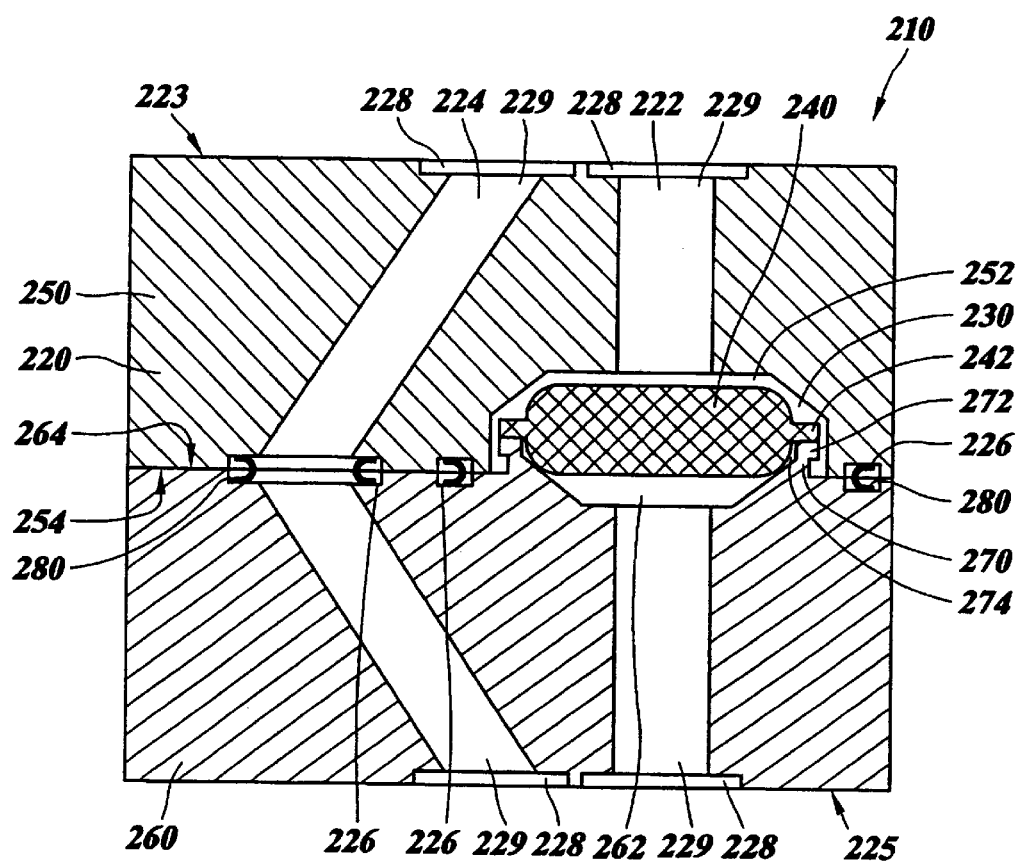
FIG. 3 is a cross-sectional view of still another embodiment of a purification assembly according to the present invention.

FIG. 3 illustrates still another embodiment of the purification assembly according to the present invention and features similar to those of the first embodiment have reference numerals which differ by 200 from those of the first embodiment. The purification assembly 210 comprises a block 220 and a purification element 240 disposed in the block 220. The block 220 may include an inlet flow path 222, an outlet flow path 224 and a cavity 230 in fluid communication with the outlet flow path 224. The purification element 240 is disposed within the cavity 230 and sealingly disposed in the outlet flow path 222. In this embodiment of purification assembly 210, the block 220 and the pieces 250, 260 forming the block 220 are thicker than the block 120 is. Therefore, the inlet flow path 222 bends at a less acute angle than the inlet flow path 122 does as shown in FIG. 1.

Figure 4:
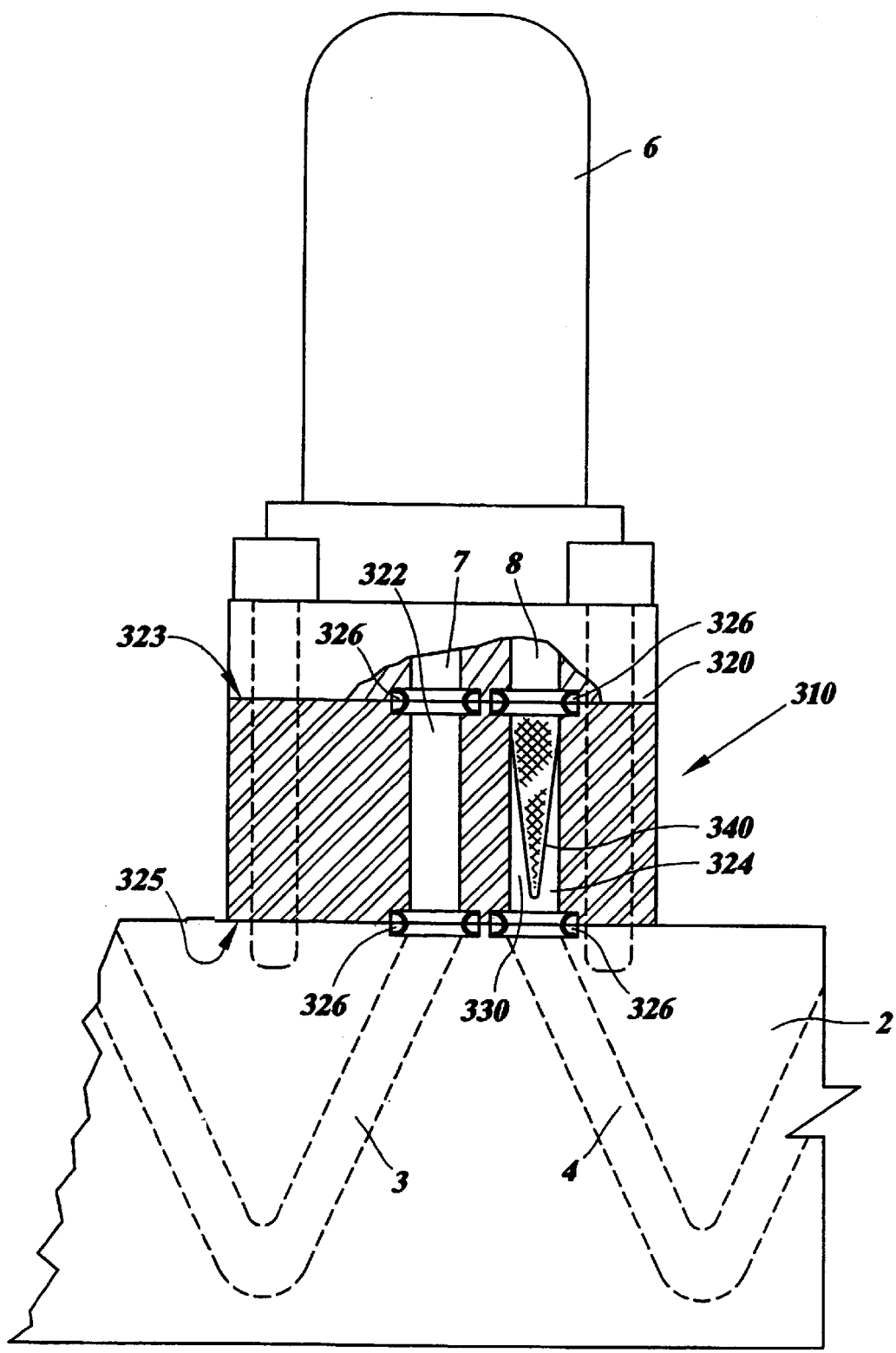
FIG. 4 is a cross-sectional view of a further embodiment of a purification assembly according to the present invention.

FIG. 4 is a cross-sectional view of a further embodiment of a purification assembly according to the present invention and features common to the first, second or third embodiment have reference numerals which differ by 300, 200 or 100, respectively. For example, the purification assembly 310 comprises a block 320 and a purification element 340 disposed in the block 320. The block 320 includes inlet and outlet flow paths 322, 324, and the purification element 340 is sealingly disposed in the outlet flow path 324. Alternatively, the purification element 340 may be sealingly disposed in the inlet flow path 322. The block 320 may also include two mounting surfaces 323, 325.

The block may have any suitable configuration, including an irregular configuration or a regular configuration, such as a cylindrical, disk-shaped or boxy configuration. The block may comprise a single unitary or integral block, or it may comprise a plurality of pieces attachable to one another to form the block. In the embodiment shown FIG. 4, the block 320 has a generally boxy configuration and includes a single unitary or integral piece.

The inlet and outlet flow paths 322, 324 may be variously configured. In FIG. 4, both the inlet and outlet flow paths 322, 324 have a straight-line configuration and are substantially parallel to each other. Alternatively, the inlet or outlet flow path may have, for example, a V-shaped or L-shaped configuration or any other suitable configuration.

Figure 5A:
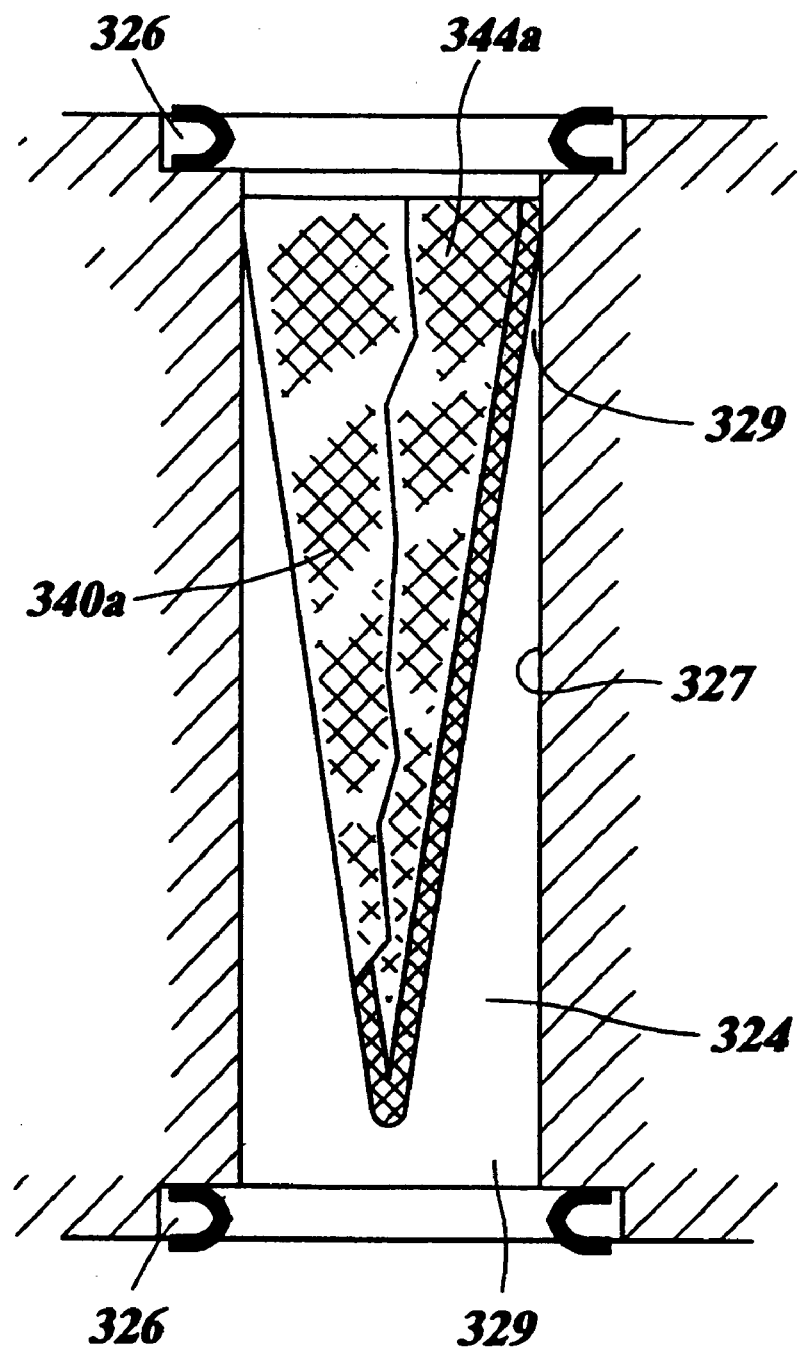
FIG. 5a is a cross-sectional view of an embodiment of the purification element shown in FIG. 4.
Figure 5B:
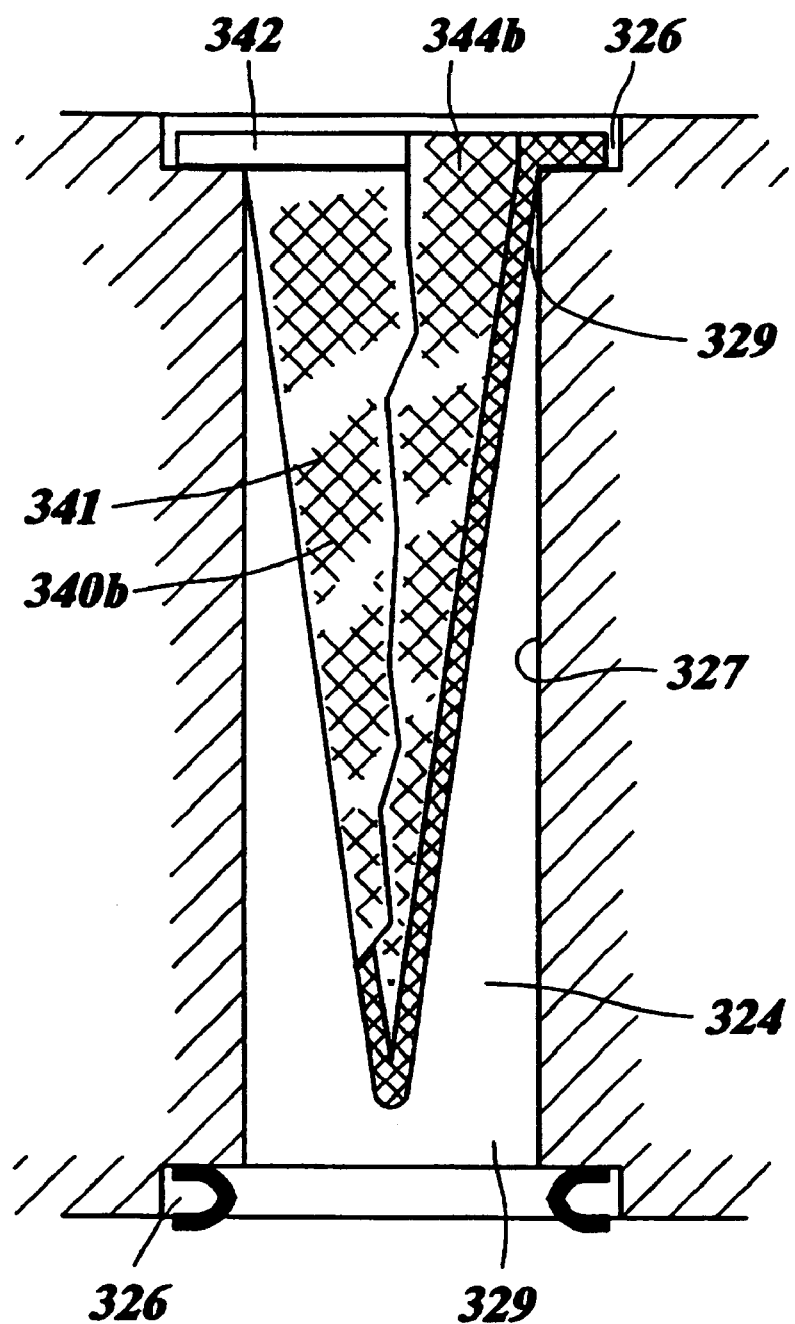
FIG. 5b is a cross-sectional view of another embodiment of the purification element shown in FIG. 5.

The purification element may have any suitable configuration. FIGS. 5a and 5b illustrate two alternative embodiments 340a, 340b of the purification element 340. Both alternative embodiments 340a, 340b of the purification element 340 have generally conical configurations. Alternatively, the purification element may have the configuration of a cylinder, truncated cone, disk, bag or dome. The surface of the purification element 340 may be substantially smooth on a macroscopic scale, but it is possible for it to be formed with ridges or corrugations to increase the surface area.

The purification element 340 may be sealingly disposed in the outlet flow path 324 (or the inlet flow path 322) in any suitable way, as shown in FIGS. 5a and 5b, for example. In FIG. 5a, the conical purification element is directly joined to the inner bore 325 of the outlet flow path 324 (or the inlet flow path 322). Preferably, the base 344a of the conical purification element 340a has a diameter substantially equal to the diameter of the inner bore 325 of the outlet flow path 324 (or the inlet flow path 322). The base 344a of the purification element 340a may then be sealingly joined to the inner bore 325, preferably permanently, sealing the purification element 340a in the outlet flow path 324 (or the inlet flow path 322). The purification element 340a may be sealingly disposed in the flow path 324 in any orientation or at any location. However, when the purification element 340a is disposed in the flow path 324, a portion of the purification element 340a preferably is visible from an opening 329 of the flow path 322, 324. This allows an operator to inspect the condition of the purification element and to ensure that there is a purification element in the flow path before the purification assembly is installed. In some embodiments, the tip of the conical purification element may extend beyond the flow path in which the conical purification element is disposed, e.g., beyond the mounting surfaces 323, 325, and into the fluid device or the manifold mounted to the purification assembly.

In FIG. 5b, the purification element 340b includes a conical purification element 341 and a flange 342 joined to the outer periphery of the base 344b of the conical purification element 341. The flange 342 of the purification element 340b may be disposed in a recess 326 around an opening 329 of the outlet flow path 324 (or the inlet flow path 322). The purification element 340b may extend into the outlet flow path 324 (or the inlet flow path 322) and possibly beyond the outlet flow path 324 into the manifold 2 or the fluid device 6. The flange 342 may be sealingly joined to the recess 326 removably or preferably permanently sealing the purification element 340b in the outlet flow path 324 (or the inlet flow path 322). When the purification element 310 is mounted to a fluid device and/or a manifold, the flange 342 of the purification element 340b may function a seal to prevent leakage between the purification element 310 and the fluid device or the manifold. Alternatively, a seal, such as a C, Z or W seal or an O-ring seal, may be disposed in the recess 326 around the outer periphery of the flange 342 or in a groove (not shown) disposed around the recess 326, to prevent leakage between the purification assembly 310 and the fluid device (or the manifold).

In the embodiments shown in FIGS. 1–4, the purification element may be joined to the block in any suitable way to form a seal, such as welding, brazing or crimping, although the preferred method is welding. When the block and the purification element are both formed from metal, it is convenient to join the two by a welding method. For example, laser welding, TIG (GTAW) welding, or electron beam welding may be used to form a weld between the block and the purification element. When the block and the purification element are made of a non-metal such as a polymeric material, they can be joined by conventional methods such as interference fitting, bonding or thermal welding.

The structure and pore size of the purification element can be chosen in accordance with the materials which are to be removed, the maximum operating temperature, and the desired flow characteristics through the purification element. When the purification element is used for purifying gases used in semiconductor manufacture, it is preferably made of a low outgassing, bakeable, and corrosion resistant material, such as stainless steel, nickel, or a Hastelloy metal. Alternatively, it may be fashioned from a polymeric material, such as a polymeric membrane or fibrous material, or from a glass fiber material or a ceramic material.

Some examples of a suitable metal purification medium for use in purifying a high purity semiconductor grade gas are (a) a depth type purification medium comprised of metal fibers sintered together at their points of contact, such as that sold by Pall Corporation under the trade designation PMF, (b) a sintered wire mesh such as that sold by Pall Corporation under the trade designation Rigimesh, (c) a wire mesh supporting sintered metal powder or fibers, such as that sold by Pall Corporation under the trade designation PMM, (d) a composite including more than one type of material, such as a depth type purification medium sandwiched between two layers of wire mesh which provide support to the upstream and downstream sides of the depth type purification medium, and (e) a reactive medium such as that sold by Pall Corporation under the trade designation GASKLEEN PPT. Certain types of reactive media are described in detail in U.S. Pat. No. 5,637,544, which are incorporated herein by reference in its entirety to support this and other features of the present invention. Any of these purification media can be formed of a corrosion resistant metal such as stainless steel or Hastelloy. A non-metallic purification element made of a polymer or a ceramic, for example, can also be employed provided that fluid compatibility and operating conditions are appropriate.

The purification element can be constructed to have specified upstream and downstream surfaces, or it can be constructed such that either surface can be employed as an upstream or downstream surface. If flow through the purification element is primarily in one direction and there is little possibility of reverse pressure surges, it may be desirable to have an asymmetric structure, such as a structure having a woven wire mesh support layer on the downstream side of a sintered metal fiber medium and having no support layer or a lighter support layer on the upstream side.

Certain types of purification elements are also described in detail in U.S. Pat. Nos. 5,490,868 and 5,545,242, which are incorporated herein by reference in their entirety to support this and other features of the present invention.

The purification assembly, other than the purification element and the seals, may be formed from any suitable material, including a metallic material, such as stainless steel, and a polymeric material. Although different parts of the purification assembly, such as the first and second pieces of the block, may be formed from different materials, preferably the purification assembly is formed from the same material, preferably from a metal such as stainless steel.

In some embodiments of the present invention, the block may be used additionally as a conventional component. For example, the block may comprise a seal conversion block, the purification element being installed in the seal conversion block. A seal conversion block is used to mount a fluid device to the manifold where the fluid device and the manifold are designed to use different seals and, therefore, the fluid device cannot be mounted directly to the manifold.

When a fluid device is directly mounted to the manifold, one or more seals, such as Z-seals, W-seals or C-seals, are generally provided to prevent gases from leaking through the gap between the fluid device and the manifold. Each seal is disposed in a counterbore on the fluid device and a counterbore on the manifold. In some cases, the fluid device and the manifold may have different counterbores for receiving different seals. For example, the fluid device may have counterbores for receiving C-seals while the manifold may have counterbores for receiving W-seals. Thus, a seal cannot be placed in the counterbores of the fluid device and the manifold. In this case, a seal conversion block may be disposed between the fluid device and the manifold for mounting a fluid device to a manifold. The fluid device and the block surface facing the fluid device may have the same type of counterbores for receiving the same type of seal, and the manifold and the block surface facing the manifold may have the same type of counterbores for receiving the same type of seal. Consequently, even if the fluid device and the manifold have different types of counterbores, a seal conversion block allows the fluid device to be mounted to the manifold.

A purification assembly incorporating a seal conversion block has a number of advantages. For example, because the block of the purification element is used as a seal conversion block—an existing component, the purification assembly does not require an additional site on the manifold or increased volume in the tubing line, a feature which may be important in the manufacture of semiconductors where space requirement is stringent. Additionally, the purification assembly is cost-effective because the purification element is installed in an existing part and a separate block may not be required.

In the above embodiments shown in FIGS. 1–4, it is not necessary to create a perfect seal between the purification element and the block piece. It is sufficient to create a seal which acts as a barrier against particulates large enough to be captured by the purification element, and the surface finish can be chosen accordingly. Additionally, although it is preferred that the purification element is permanently, sealingly joined to the block, the purification element may be removably, sealingly attached to the block. If removably attached, the purification element can be replaced without replacing the block. Further, it is possible that a cavity and a purification element disposed in the cavity may be placed in each of the inlet and outlet flow paths.

As described above and shown specifically in FIG. 4, the purification element 10, 110, 210, 310 of any of the embodiments may be mounted to a manifold 2, and another fluid device 6 may then be mounted on the purification assembly 10, 110, 210, 310. In other words, the purification assembly may be sandwiched between the manifold 2 and the fluid device 6. The inlet and outlet flow paths of the purification assembly preferably are aligned with the inlet and outlet flow paths 3, 4, 7, 8 of the manifold 2 and the fluid device 6, respectively. The fluid device 6 and the block of the purification assembly 10, 110, 210, 310 and bolted to the manifold 2, although any other fastening means may be employed. Alternatively, a purification assembly embodying the invention may be mounted between two fluid devices.

A method of purifying gases according to the present invention includes directing gases through a purification element disposed in a block installed between a fluid device and a manifold. The method may also include directing fluid, such as gas, to pass from a V-shaped fluid conduit 3 of the manifold 2, through the inlet flow path of the purification assembly (and a purification element if a purification element is disposed in the inlet flow path), and into the inlet flow path 7 of the fluid device 6. The fluid may then return from the outlet flow path 8 of the fluid device 6, pass through the outlet flow path of the purification assembly (and a purification element if a purification element is disposed in the outlet flow path), and enter another fluid conduit 4 of the manifold 2.

What is claimed is:

1. A purification assembly comprising:
   a block including first and second pieces attachable to each other, the block having first and second fluid flow paths;
   a cavity defined by the first and second pieces and disposed in the first fluid flow path; and
   a purification element disposed in the cavity and in the first fluid flow path, wherein fluid flowing through the first fluid flow path passes through the purification element.

2. The purification assembly of claim 1, wherein the first fluid flow path is an inlet flow path and the second fluid flow path is an outlet flow path.

3. The purification assembly of claim 1, wherein the first fluid flow path is an outlet flow path and the second fluid flow path is an inlet flow path.

4. The purification assembly of claim 1, wherein the block includes first and second mounting surfaces.

5. The purification assembly of claim 4, wherein the first surface is mountable to a manifold and the second mounting surface is mountable to a fluid device.

6. The purification assembly of claim 4, wherein the first and second fluid flow paths extend between the first and second mounting surfaces.

7. The purification assembly of claim 1, wherein the purification element has a disk-shaped configuration and includes a circular flange disposed around an outer periphery of the purification element.

8. The purification assembly of claim 7, wherein the cavity has a disk-shaped configuration.

9. The purification assembly of claim 1, wherein the cavity includes two portions, one of the portions being disposed in the first piece and the other portion being disposed in the second piece.

10. The purification assembly of claim 1 comprising a standoff disposed in the cavity.

11. The purification assembly of claim 10, wherein the purification element is mounted on the standoff.

12. The purification assembly of claim 10, wherein the standoff forms a unitary part with the block.

13. The purification assembly of claim 10, wherein the standoff has an opening and a flange disposed around the opening.

14. The purification assembly of claim 13, wherein the purification element includes a circular flange disposed around an outer periphery of the purification element, the flange of the purification element being mounted on the flange of the standoff.

15. The purification assembly of claim 1, wherein the block comprises a seal conversion block for mounting a fluid device to a manifold.

16. A purification assembly comprising:
   a block having first and second opposite mounting surfaces and including a plurality of bores extending between the first and second mounting surfaces; and
   a purification element disposed in one of the bores.

17. The purification assembly of claim 16, wherein one of the bores is an inlet flow path and another bore is an outlet flow path.

18. The purification assembly of claim 16, wherein the inlet and outlet flow paths are straight bores parallel to each other.

19. The purification assembly of claim 16, wherein the purification element has a conical configuration.

20. The purification assembly of claim 17, wherein the purification element is disposed in the inlet flow path.

21. The purification assembly of claim 17, wherein the purification element is disposed in the outlet flow path.

22. The purification assembly of claim 17, wherein the purification element is sealingly joined to an inner bore of the inlet flow path.

23. The purification assembly of claim 17, wherein the purification element is sealingly joined to an inner bore of the outlet flow path.

24. The purification assembly of claim 17, wherein the purification element includes a flange.

25. The purification assembly of claim 24, wherein the flange of the purification element is placed in a recess disposed around an opening of the inlet flow path.

26. The purification assembly of claim 24, wherein the flange of the purification element is placed in a recess disposed around an opening of the outlet flow path.

27. The purification assembly of claim 16, wherein the block comprises a unitary piece.

28. The purification assembly of claim 16, wherein the first mounting surface is mountable to a manifold and the second mounting surface is mountable to a fluid device.

29. A purification assembly for use with at least one fluid device, the purification assembly comprising:
   a block having first and second fluid flow paths and a mounting surface arranged to receive the fluid device and
   a purification element disposed in the block in one of the first and second fluid paths and arranged to purify gases flowing to or from the fluid device.

30. The purification assembly of claim 29, wherein the block includes another mounting surface arranged to receive a manifold.

31. The purification assembly of claim 29, wherein the block includes a cavity and the purification element is disposed in the cavity.

32. The purification assembly of claim 31, wherein the block includes a standoff having a flange and disposed in the cavity, and the purification element is mounted on the standoff.

33. The purification assembly of claim 32, wherein the purification element includes a circular flange disposed around an outer periphery of the purification element, the flange of the purification element being mounted on the flange of the standoff.

34. An assembly for processing gases comprising:
- a purification assembly including a block having first and second fluid flow paths;
- a fluid device; and
- a manifold, the purification assembly being coupled between the fluid device and the manifold to allow gases to flow through the manifold, through the purification assembly and through the fluid device.

35. The assembly of claim 34, wherein the purification assembly comprises a purification element disposed in the block in one of the first and second fluid flow paths and arranged to purify gases flowing through the block.

36. The assembly of claim 34, wherein the purification assembly includes first and second mounting surfaces.

37. The assembly of claim 36, wherein the first surface is mountable to the manifold and the second mounting surface is mountable to the fluid device.

38. The assembly of claim 35, wherein the block includes a cavity and the purification element is disposed in the cavity.

39. The assembly of claim 38, wherein the block includes a standoff having a flange and disposed in the cavity, and the purification element is mounted on the standoff.

40. The assembly of claim 39, wherein the purification element includes a circular flange disposed around an outer periphery of the purification element, the flange of the purification element being mounted on the flange of the standoff.

41. A method for purifying gases comprising directing gases through a processing assembly comprising a purification assembly coupled between a manifold and a fluid device, including directing the gases from the manifold through a first fluid flow path of the purification assembly to the fluid device and from the fluid device through a second fluid flow path of the purification assembly to the manifold.

42. The method of claim 41, wherein the purification assembly includes a block having the first and second fluid flow paths and the method includes directing the gases through a purification element disposed in one of the first and second fluid flow paths of the block.

43. The method of claim 41 comprising directing gas from a fluid conduit of the manifold to an inlet flow path of the block.

44. The method of claim 43 comprising directing gas from the inlet flow path of the block into an inlet port of the fluid device.

45. The method of claim 44 comprising directing gas from an outlet port of the fluid device into an outlet flow path of the block.

46. The method of claim 44 comprising directing gas from the outlet flow path of the block into another fluid conduit of the manifold.

* * * * *